United States Patent
Johnston

(10) Patent No.: US 10,394,795 B2
(45) Date of Patent: Aug. 27, 2019

(54) SYNCHRONIZED CAPTURE OF TRANSACTIONAL DATA FROM MULTIPLE JOURNALS

(71) Applicant: Oracle International Corporation, Redwood Shores, CA (US)

(72) Inventor: Richard Johnston, Ontario (CA)

(73) Assignee: Oracle International Corporation, Redwood Shores, CA (US)

( * ) Notice: Subject to any disclaimer, the term of this patent is extended or adjusted under 35 U.S.C. 154(b) by 207 days.

(21) Appl. No.: 15/707,586

(22) Filed: Sep. 18, 2017

(65) Prior Publication Data

US 2018/0081957 A1  Mar. 22, 2018

Related U.S. Application Data

(60) Provisional application No. 62/396,053, filed on Sep. 16, 2016.

(51) Int. Cl.
| | |
|---|---|
| *G06F 16/30* | (2019.01) |
| *G06F 16/23* | (2019.01) |
| *G06F 16/27* | (2019.01) |
| *G06F 9/54* | (2006.01) |

(52) U.S. Cl.
CPC .......... *G06F 16/2358* (2019.01); *G06F 9/547* (2013.01); *G06F 16/2365* (2019.01); *G06F 16/2379* (2019.01); *G06F 16/275* (2019.01); *G06F 16/278* (2019.01)

(58) Field of Classification Search
CPC . G06F 16/2358; G06F 16/2365; G06F 16/275
See application file for complete search history.

(56) References Cited

U.S. PATENT DOCUMENTS

| | | | | |
|---|---|---|---|---|
| 2006/0129611 | A1* | 6/2006 | Adkins | G06F 11/1435 |
| 2009/0217274 | A1* | 8/2009 | Corbin | G06F 9/466 |
| | | | | 718/101 |
| 2012/0030172 | A1* | 2/2012 | Pareek | G06F 16/3331 |
| | | | | 707/635 |
| 2012/0254120 | A1* | 10/2012 | Fang | G06F 16/2379 |
| | | | | 707/648 |
| 2017/0091086 | A1* | 3/2017 | Davis | G06F 16/11 |

OTHER PUBLICATIONS

Article entitled Oracle GoldenGate for DB2 for I, by Oracle, dated Aug. 2012.*

(Continued)

*Primary Examiner* — Mahesh H Dwivedi
(74) *Attorney, Agent, or Firm* — Kilpatrick Townsend & Stockton LLP

(57) ABSTRACT

The present disclosure relates generally to electronic data, and more particularly, to techniques for synchronizing the capture of change data from multiple transaction journals. In various embodiments, a technique includes writing of discrete markers in the individual journals to facilitate the determination of consistent read points across the various journals to eliminate the effects of memory or disk caching that may interfere with the proper sequential ordering of transactional data across the individual journals in a single transaction processing program.

17 Claims, 6 Drawing Sheets

(56) References Cited

OTHER PUBLICATIONS

Oracle Integrated Cloud Applications & Platform Services, "Oracle GoldenGate", retrieved Apr. 5, 2018 from http://www.oracle.com/technetwork/middleware/goldengate/overview/index.html.
IBM Knowledge Center, "IBM i", retrieved Apr. 5, 2018 from https://www.ibm.com/support/knowledgecenter/ssw_ibm_i.
IBM Knowledge Center, "IBM i7.1 documentation", retrieved Apr. 5, 2018 from https://www.ibm.com/support/knowledgecenter/ssw_ibm_i_71/welcome.html.
IBM Knowledge Center, "IBM PASE for i", retrieved Apr. 5, 2018 from https://www.ibm.com/support/knowledgecenter/ssw_ibm_i_71/rzalf/rzalfintro.htm.
IBM Knowledge Center, "Control language", retrieved Apr. 5, 2018 from https://www.ibm.com/support/knowledgecenter/ssw_ibm_i_71/rbam6/rbam6clmain.htm.
IBM Knowledge Center, "Database", retrieved Apr. 5, 2018 from https://www.ibm.com/support/knowledgecenter/ssw_ibm_i_71/rzahg/rzahgdb.htm.
IBM Knowledge Center, "SQL call level interface", retrieved Apr. 5, 2018 from https://www.ibm.com/support/knowledgecenter/ssw_ibm_i_71/cli/rzadpkickoff.htm.
IBM Knowledge Center, "Journal entry information", retrieved Apr. 5, 2018 from https://www.ibm.com/support/knowledgecenter/ssw_ibm_i_71/rzaki/rzakijrnentry.htm.
IBM Knowledge Center, "Programming", retrieved Apr. 5, 2018 from https://www.ibm.com/support/knowledgecenter/ssw_ibm_i_71/rzahg/rzahgicprog2.htm.
IBM Power Systems, "IBM i—The integrated platform enabling flexibility, resilience and dependability—no matter the size of your business. Read the analyst reports", retrieved Apr. 5, 2018 from https://www.ibm.com/power/operating-systems/ibm-i?cm_re=masthead-_-products-_-sys-iseries.
IBM Power Systems, "Journal management concepts", retrieved Apr. 5, 2018 from https://www.ibm.com/support/knowledgecenter/ssw_ibm_i_71/rzaki/rzakiconcepts.htm.
GoldenGate Software, Inc., "VAM Capture API", dated Sep. 2007, 17 pages.
Oracle Corporation, Oracle GoldenGate Windows and UNIX Reference Guide 11g Release 1 Patch Set 1 (11.1.1.1) E21512-02, May 2011, pp. 1-14.

* cited by examiner

Have marker entries been written to all N (where N is the number of Journals) journals
    No -> Write marker entries to the journals
    Yes -> proceed to process entries Read Journals Valid read sync available?
        Where N is the number of journals, are there at least N-1 marker entries read?
            No -> Write marker entries to all journals without one read and re-read

| Journal | Entry # | Marker |
|---|---|---|
| A | 5 | N |
| B | 3 | N |
| C | 8 | N |

| Journal | Entry # | Marker |
|---|---|---|
| A | 12 | Y |
| B | 3 | N |
| C | 11 | Y |

No -> Write marker entries to the journals and re-read
    Yes -> proceed to process entries

FIG. 2

SYNCHRONIZED CAPTURE OF TRANSACTIONAL DATA FROM MULTIPLE JOURNALS

CROSS-REFERENCE TO RELATED APPLICATION

The present application claims priority and benefit from U.S. Provisional Application No. 62/396,053, filed Sep. 16, 2016, entitled "CHANGE DATA CAPTURE PROCESSING AND ANALYSIS," the entire content of which is incorporated herein by reference for all purposes.

BACKGROUND

The present disclosure relates generally to electronic data, and more particularly, to techniques (e.g., systems, methods, computer program products storing code or instructions executable by one or more processors) for synchronizing the capture of change data from multiple transaction journals.

Traditionally the capturing of transactional information from databases for actions being taken by an application, for example an enterprise application, involves running a change data capture process, which is a set of software design patterns used to determine (and track) the data that has changed so that the action can be taken using the changed data rather than outdated data. In certain systems each of the databases has a single transaction log of transactional information (also known as a transaction journal or journal) that is read when tracking the operations that take place against the databases. Accordingly, the extract spans a single journal and there are no issues regarding the consistency of the transaction information and the synchronization of the reader.

However, in other systems (for example the IBM i operating system), there is no requirement for there to be a single transaction journal for the database. Instead, there may be multiple journals for the database (e.g., any individual table is recorded in a single journal but different tables may be recorded in different journals). Consequently, there is a possibility that there will be multiple journals in an extract and there is a potential issue as to whether there needs to be a synchronization between the journals. For example, since these other systems such as the IBM i operating system, allow a transaction to implicitly or explicitly span journals it is required that the journal reader for an extract include all of the journals that a transaction would include to ensure transactional consistency. There is no way to ensure this has been done by the user or the operating system. Therefore, techniques for synchronizing change data from multiple transaction journals of a database is desired.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for dynamically determining a size of a partition, including: executing, by a computing device using a reader, a journal read process to read one or more journals. The method also includes determining, by the computing device, whether the reader is at an end of a journal. The method also includes determining, by the computing device, whether a last entry of the journal is user defined with a marker journal entry, when the reader is at the end of the journal. The method also includes marking, by the computing device, the journal as synced, when the last entry of the journal is user defined with the marker journal entry. The method also includes determining, by the computing device, whether the reader is expecting a specific marker entry sync identifier, when the last entry of the journal is not user defined with the marker journal entry. The method also includes writing, by the computing device, a new marker journal entry in the journal and marking all journals as needing a sync, when the reader is expecting the specific marker entry sync identifier. Other embodiments of this aspect include corresponding computer systems, apparatus, and computer programs recorded on one or more computer storage devices, each configured to perform the actions of the methods.

Implementations may include one or more of the following features. The method where the marker journal entry is written to the journal using an application one or more application program interfaces (API) of the operating system. The method where operating system is the IBM i operating system. The method further including writing, by the computing device, a new marker entry in the journal, and marking all journals as needing a sync, when the reader is not at the end of the journal. The method further including executing, by the computing device using the reader, the journal read process to re-read the journal, when the reader is not expecting the specific marker entry sync identifier. The method where determining whether the reader is at the end of the journal includes determining when a read of the journal is complete, and the API will indicate whether there are more entries left to read or not through a flag in a returned buffer header provided by the API. The method where marking the journal as synced includes using a flag that indicates whether or not the journal is considered as read synced or not at any given time for purposes of being able to merge entries from the one or more journals in an order in which the entries have occurred. Implementations of the described techniques may include hardware, a method or process, or computer software on a computer-accessible medium.

One general aspect includes a system, including: a memory configured to store computer-executable instructions; and a processor configured to access the memory and execute the computer-executable instructions to. The system also includes execute, using a reader, a journal read process to read one or more journals. The system also includes determine whether the reader is at an end of a journal. The system also includes determine whether a last entry of the journal is user defined with a marker journal entry, when the reader is at the end of the journal. The system also includes mark the journal as synced, when the last entry of the journal is user defined with the marker journal entry. The system also includes determine whether the reader is expecting a specific marker entry sync identifier, when the last entry of the journal is not user defined with the marker journal entry. The system also includes write a new marker journal entry in the journal and marking all journals as needing a sync, when the reader is expecting the specific marker entry sync identifier. Other embodiments of this aspect include corresponding computer systems, apparatus, and computer programs recorded on one or more computer storage devices, each configured to perform the actions of the methods.

Implementations may include one or more of the following features. The system where the marker journal entry is written to the journal using an application one or more application program interfaces (API) of the operating system. The system where operating system is the IBM i operating system. The system where the computer-executable instructions are further executable to write a new marker entry in the journal, and marking all journals as needing a sync, when the reader is not at the end of the journal. The system where the computer-executable instructions are further executable to execute, using the reader, the journal read process to re-read the journal, when the reader is not expecting the specific marker entry sync identifier. The system where determining whether the reader is at the end of the journal includes determining when a read of the journal is complete, and the API will indicate whether there are more entries left to read or not through a flag in a returned buffer header provided by the API. The system where marking the journal as synced includes using a flag that indicates whether or not the journal is considered as read synced or not at any given time for purposes of being able to merge entries from the one or more journals in an order in which the entries have occurred. Implementations of the described techniques may include hardware, a method or process, or computer software on a computer-accessible medium.

One general aspect includes a computer-readable medium storing computer-executable code that, when executed by a processor, cause the processor to perform operations including: executing, using a reader, a journal read process to read one or more journals. The computer-readable medium also includes determining whether the reader is at an end of a journal. The computer-readable medium also includes determining whether a last entry of the journal is user defined with a marker journal entry, when the reader is at the end of the journal. The computer-readable medium also includes marking the journal as synced, when the last entry of the journal is user defined with the marker journal entry. The computer-readable medium also includes determining whether the reader is expecting a specific marker entry sync identifier, when the last entry of the journal is not user defined with the marker journal entry. The computer-readable medium also includes writing a new marker journal entry in the journal and marking all journals as needing a sync, when the reader is expecting the specific marker entry sync identifier. Other embodiments of this aspect include corresponding computer systems, apparatus, and computer programs recorded on one or more computer storage devices, each configured to perform the actions of the methods.

Implementations may include one or more of the following features. The computer-readable medium where the marker journal entry is written to the journal using an application one or more application program interfaces (API) of the operating system. The computer-readable medium where operating system is the IBM i operating system. Implementations of the described techniques may include hardware, a method or process, or computer software on a computer-accessible medium

BRIEF DESCRIPTION OF THE DRAWINGS

FIGS. 2 and 3 illustrate a process for facilitating a fully synchronized capture of transactional data from multiple journals in accordance with various embodiments.

DETAILED DESCRIPTION

I. Introduction

Figure 1:
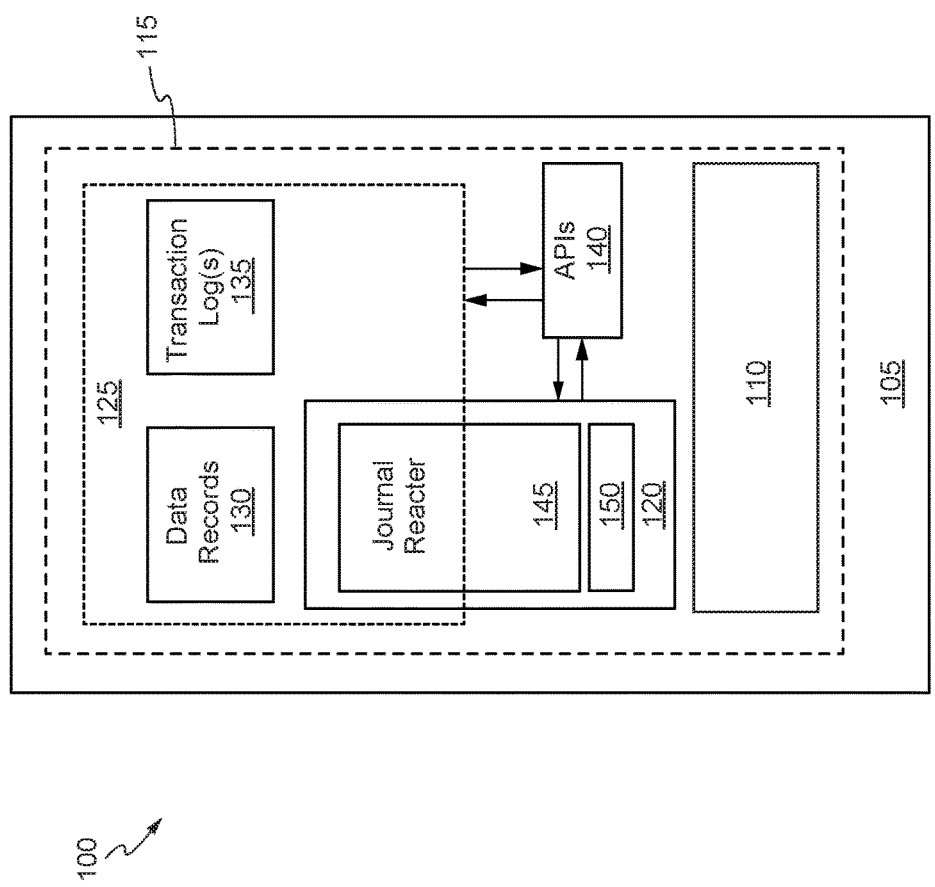
FIG. 1 illustrates a block diagram of a system environment at a high level according to various embodiments.

The following disclosure describes techniques for synchronizing change data from multiple transaction journals of a database for use by an application, for example, an enterprise application such as Oracle's GoldenGate software package for real-time data integration and replication (i.e., ORACLE® GoldenGate). In some instances, it is advantageous to have the application take action on the captured change data from multiple transactional journals. For example, in certain instances, there is a possibility that there will be multiple journals in an extract and there is a potential issue as to whether there needs to be a synchronization between the journals in any way. For example, on the IBM DB2® database for the IBM i operating system there is no specific dedicated log repository, but there are journals. A journal is a similar concept as a database log on the other platforms, but there is no default journal for database transactions to be recorded for any database instance unlike on most other database systems. The customer can have as many journals as they would like on a machine. The transactions can be in any journals they want and they are not tied to any particular location on the system. However, there is no way to ensure synchronization between the journals in any way has been done by the user or the operating system.

To address these problems, various embodiments provide techniques (e.g., systems, methods, computer program products storing code or instructions executable by one or more processors) for synchronizing the capture of change data from multiple transaction journals. Some embodiments may facilitate the fully synchronized capture of transaction data of a single transaction that is split across multiple journals on an IBM i system. Other embodiments may facilitate the fully synchronized capture of transactional data from multiple journals on an IBM i system. Yet other embodiments may enable each journal to read independently to enhance performance while maintaining a properly merged transaction stream.

In some embodiments, a customer may have one journal for an application but want to use a different journal for another service that would provide a type of checkpoint for them in terms of their recovery processing. In such a case, some embodiments may have to support reading from more than one journal. There are problems with using multiple journals for any one application, so one might have one table journal to one journal and another table journal to another journal where they may both be in a single transaction where one transaction is a start commit to a commit. Some embodiments may synchronize and handle transactions that are split across journals. A journal (similar to a database log) can be associated with one or more tables, while not being tied to any one thing. A journal can be anywhere in the system and an object may attach to it to capture the changes that are taking place. The journal can keep track of changes to multiple database objects.

Due to the way that the system operates, it is difficult to guarantee that when reading from more than one journal that one is seeing the last entries in those journals. As such, some embodiments may read to the end of each journal, but then possibly due to caching at various levels within the operating system, it may not be seeing the last entries for any given journal relevant to another one. If the system is reading from for example two journals and one of them has been cached, there may have been entries written that are logically later than the last one that is read in the other journal, but the system cannot see them yet because they haven't been made available by the operating system. The reading may get out of order and cause problems. The system may write that out to the trail, then the cache may be flushed. The system may read from the other journal and get data earlier than that data that we have already flushed. Now, the system may have got things that are earlier in time than what the system has already written to the trail.

For performance reasons, the operating system doesn't necessarily write everything immediately to disk because that may be slow. When looking at multiple sources of data, some embodiments may ensure that the data is obtained in order and that the data is obtained in such a way that the performance of the system is not impacted at the same time. In some instances, the operating system may be holding some things in the disk controller's memory or it might be holding it in the main memory. As such, when reading from multiple sources, some embodiments may use various methods to obtain data in the right order.

Some embodiments may read in a round robin fashion with however many journals are relevant to the embodiment. When it comes to do another read, some embodiments may look through each journal to be read, determine which the earliest data and then send that back to be processed. This is then repeated. So it may be that on every cycle through the journals, certain embodiments may get the same data back for a journal because it is later than anything that comes up from other journals, for example. So anytime embodiments may need to get a new journal entry to processes, each journal would be read. For example, if there were two, certain embodiments may read both journals, look at the entries for both of them and determine which one is earlier and process that journal entry.

A problem may occur when the reader has hit the end of a journal. It may be difficult to confirm whether there are any more journal entries that are sitting in the system that are not visible. There may be entries that are still out there earlier from the other one that the system is unaware of and would need to take action to synchronize. Certain embodiments may place a marker at the end of a journal reading that forces a synchronization since it is possible that sequence number is still in memory and has not yet flushed to disk for journal number two, although it's in process of being written to journal number two. Before flushing out number three, some embodiments check for number four in the second journal in which case the system then knows two is not ever going to appear or there isn't anything. There is no risk of two showing up after three is flushed from the first journal.

Certain embodiments may insert an marker in the journal that is at the end of at least one of the journals. Whichever journal or journals that the system has decided it is at the end of, the system may put a marker in the journal. The system may not proceed until the system sees that marker because then the system will know the point at which it had put in the marker. Now, that the system is able to read it and knows that enough has been flushed such that it can guarantee synchronization up to that point. In some embodiments, the scheduler may be modified and perform preemptive scheduling.

II. System Architecture for the Synchronization of Change Data

FIG. 1 illustrates a block diagram of a system environment 100 at a high level according to various embodiments.

The system includes a computing system 105 comprising a target database 110. The computing system 105 and may comprise one or more computing device, for example, computers and/or servers, which may be general purpose computers and/or servers, or specialized computers and/or servers. The computing devices that make up the computing system 105 may run one or more operating systems and/or a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like. In some embodiments, the computing system is running an operating system 115, for example, the IBM i operating system. The operating system 115 may be utilized to execute one or more applications 120 and is in communication with a source database 125 (e.g., the IBM DB2® database).

In various embodiments, the operating system 115 is the IBM i operating system. The IBM i operating system is the operating system that runs on IBM Power Systems and on IBM PureSystems. The name was introduced in 2008, and it is the current evolution of the operating system, previously named i5/OS, and originally named OS/400 when it was introduced with the AS/400 computer system in 1988.

In various embodiments, the one or more applications 120 include an enterprise application such as ORACLE® GoldenGate software package. The ORACLE® GoldenGate software package enables the exchange and manipulation of data at the transaction level among multiple, heterogeneous platforms across an enterprise. In some embodiments, the application such as ORACLE® GoldenGate software package may be configured for one or more purposes including (i) static extraction of data records from a database (e.g., the source database 125) and the loading of those records to another database (e.g., the target database 110), (ii) continuous extraction and replication of transactional Data Manipulation Language (DML) operations and data definition language (DDL) changes (for supported databases) to keep source and target data consistent, and (iii) extraction of data records from a database and replication of the data records to a file outside the database. The extraction processes may capture source tables or a static set of record data 130 directly from source objects (e.g., an initial load), data from database recovery logs, data from transaction journals 135 (e.g., logs that include change data such that the obtained static set of data can be synchronized with another set of the data), and associated metadata. When configured for change synchronization, the extraction processes capture the DML and DDL operations that are performed on objects in the extract configuration. The extract processes may store these operations until it receives commit records or rollbacks for the transactions that contain them. When a rollback is received, the extract processes discard the operations for that transaction. When a commit is received, the extract processes persist the transaction to disk in a series of files called a trail, where it is queued for propagation to the target system. All of the operations in each transaction are written to the trail files as a sequentially organized transaction unit. The trail files may then be pumped to a target application or system (e.g., an enterprise system or application). As the trail files come into the target system or application, they may be distributed to the target database 110 and applied to target record data.

In various embodiments, the source database 125 is the IBM DB2® database for the IBM i operating system. The IBM DB2® database contains database server products developed by IBM. These database server products all support the relational model, but in recent years some products have been extended to support object-relational features and non-relational structures like JSON and XML. The database server products for the latest version DB2 12 are built on the core capabilities of DB2 11. The source database 125 may include one or more transaction journals 135 (also called a transaction log, database log, binary log, or audit trail), which can be exposed through one or more application program interfaces (APIs) 140. The one or more transaction journals 135 is a history of actions executed by a database management system used to guarantee Atomicity, Consistency, Isolation, Durability (ACID) properties over crashes or hardware failures. Physically, the one or more transaction journals 135 is a file listing changes (e.g., change data) to the source database 125, stored in a stable storage format.

In various embodiments, the one or more applications 120 include a journal reader 145 (e.g., getJournalEntries API) that will iterate through a list of journals, which includes one or more transaction journals 135 and read the available entries from the one or more transaction journals 135. Journal reader 145 may keep track of a system sequence number of the entries read to ensure that all entries are read earliest first. The system sequence number is an additional sequence number that may be included in the journal data to allow the merging of entries across journals. Conventional timestamps are not guaranteed across journals to necessarily be accurate to the microsecond in ordering. Once an entry has been found it is returned (or end-of-file (EOF) if nothing is left to read). In certain embodiments, only the one or more transaction journals 135 and transactions local to the source database 125 are supported. The entries in the one or more transactional journals 135 is returned by the journal reader 145 in an entry buffer of a shared memory 150.

In various embodiments, the journal reader 145 may be configured to take the following steps when inspecting each entry in the one or more transactional journals 135: save the current timestamp and a journal sequence number in a local context, and if the entry type is a previous receiver type entry, save the new receiver information and continue. Alternatively, if the entry type is one of: a start commit, a commit, or a rollback, then the entry is processed. Otherwise, if the entry is one of: an insert, an update before, an update, a delete, a clear member or truncate, the entry is processed. In some embodiments, the processing of the entry includes setting up a return entry buffer with the timestamp, sequence number and commit cycle id and entry type with those from the journal entry, setting the context information (where in the context area this journal's information is, and copy the context information), setting the unit of work to the commit cycle id, and saving the data and null indicators in the return entry buffer.

III. Methods for the Synchronization of Change Data

Figure 3:
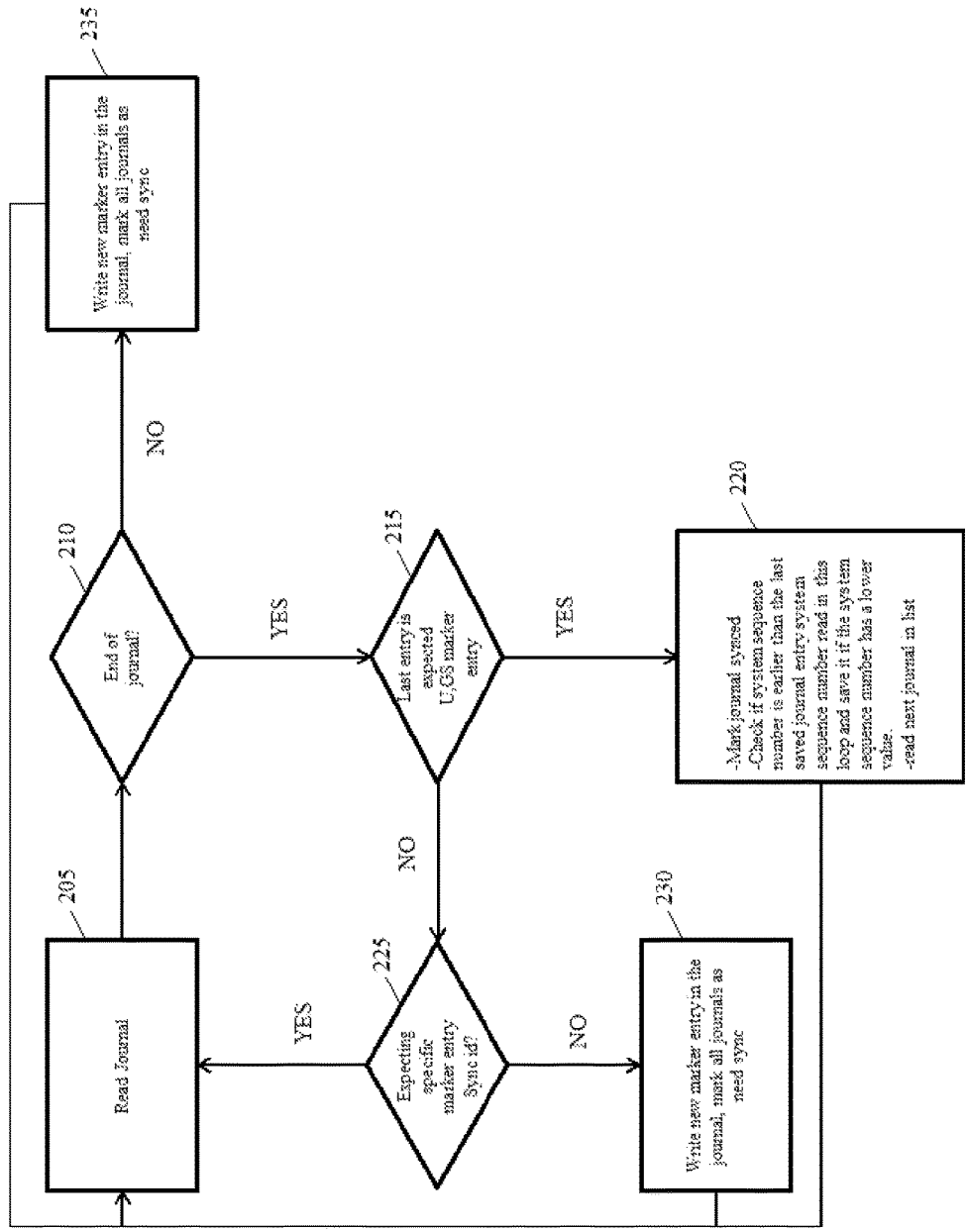

FIGS. 2 and 3 illustrate a technique for synchronizing the capture of change data from multiple transaction journals in accordance with various embodiments. Individual embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes and/or operations depicted by in FIGS. 2 and 3 may be implemented in software (e.g., code, instructions, program) executed by one or more processing units (e.g., processors cores), hardware, or combinations thereof. The software may be stored in a memory (e.g., on a memory device, on a non-transitory computer-readable storage medium). The particular series of processing steps in FIGS. 2 and 3 is not intended to be limiting. Other sequences of steps may also be performed according to alternative embodiments. For example, in alternative embodiments the steps outlined above may be performed in a different order. Moreover, the individual steps illustrated in FIGS. 2 and 3 may include multiple sub-steps that may be performed in various sequences as appropriate to the individual step. Furthermore, additional steps may be added or removed depending on the particular applications. One of ordinary skill in the art would recognize many variations, modifications, and alternatives.

The following terminology is used for understanding processes and/or operations depicted by in FIGS. 2 and 3.

As used herein, the term Read Sync means a mechanism under which any journal that is part of a multi journal change data read process is considered to be synchronized with any entries that may have been previously cached in memory and therefore not visible initially to the journal read process.

As used herein, the term Marker Entry means an entry written to a specific journal using one of the available APIs (e.g., APIs available through IBM I operating system) that allow a process to do this such as SNDJRNE. The journal entry type would be 'U' (user defined) and a marker journal entry (GS) with entry specific data indicating that it is a Sync (e.g., ORACLE® GoldenGate) entry to ensure another program is not also using GS for its purposes. A sync ID may be written in the entry specific data as well to indicate which sync it is, and this could be a simple integer value.

As used herein, the term Marking a journal as synced means the list of journals that are read for any specific journal read process will allow for a flag that indicates whether or not the specific journal is considered as read synced or not at any given time for the purposes of being able to merge the entries from multiple journals in the list in the order in which they have occurred.

As used herein, the term End of journal means when a read of a journal is complete, the API (e.g., APIs available through IBM I operating system) will indicate whether there are more entries left to read or not through a flag in the returned buffer header provided by the API. If the indication is that there are no more entries available, it is possible that there are no more cached entries either and therefore the journal is considered to be at the end of the journal. In a multi-journal read scenario it is not good enough to use the indication of no more entries as the end of journal since other entries may be cached, and not visible, so a marker entry must be placed in the journal and subsequently read to establish a sync point for at least that entry that would indicate that any cached entries that may have been present prior to the sync entry have been read. At this point if there are no more entries, it is possible to consider the journal as being at end of journal.

As used herein, the term System sequence number means a sequence number generated by the operating system (e.g., the IBM I operating system) and included in the journal entries as the only way to order journal entries between journals.

FIG. 2 shows preprocessing for facilitating the fully synchronized capture of transactional data from multiple journals. The preprocessing may include determining whether marker entries been written to all N (where N is the number of Journals) journals. Writing marker entries to the journals when the marker entries have not been written to all N journals. Proceeding to process entries when the when the marker entries have been written to all N journals. Determining whether a valid read sync is available, where N is the number of journals, and are there at least N−1 marker entries read. Writing marker entries to all journals without one read and re-read when a valid read sync is not available. Writing marker entries to the journals and re-read when a valid read sync is not available. Proceeding to process entries when a valid read sync is available.

FIG. 3 shows a flowchart that illustrates a process 200 for facilitating the fully synchronized capture of transactional data from multiple journals. At step 205, execute a journal read process to read one or more journals, and for each journal in the journal read process, read the journal (e.g., read of object). At step 210, a determination is made as to whether the reader is at the end of the journal. At step 215, when the reader is at the end of the journal, a determination is made whether the last entry is of the type U with a GS marker journal entry with a correct sync id. At step 220, when the last entry is of the type U with a GS marker journal entry with a correct sync id, mark the journal as synced, check if system sequence number is earlier than the last saved journal entry system sequence number read in this loop and save it if the system sequence number has a lower value, and proceed to read the next journal in accordance with step 205. At step 225, when the last entry is not of the type U with a GS marker journal entry with a correct sync id, determine whether the reader is expecting a specific marker entry sync id. When the reader is expecting a specific marker entry sync id, re-read the same journal in accordance with step 205. At step 230, when the reader is not expecting a specific marker entry sync id, write a new marker entry in the journal, and mark all journals as needing a sync. At step 235, when the reader is not at the end of the journal, write new marker entry in the journal, and mark all journals as need sync. In some embodiments, when the reader is not at the end of the journal, the process further includes checking whether the system sequence number is earlier than the last saved journal entry system sequence number read in this loop and save the system sequence number when the system sequence number is earlier. Once all the journals have been read, the saved entry will be the next entry in order from all of the journals which should be processed next, unless all journals are at end of journal then indicate that there are no more entries to read at this time. At this point normal journal entry processing by the extract process will take place for the specific journal entry data will proceed and the above steps and the extract process will repeat the journal read steps when the next journal entry needs to be read.

Figure 4:
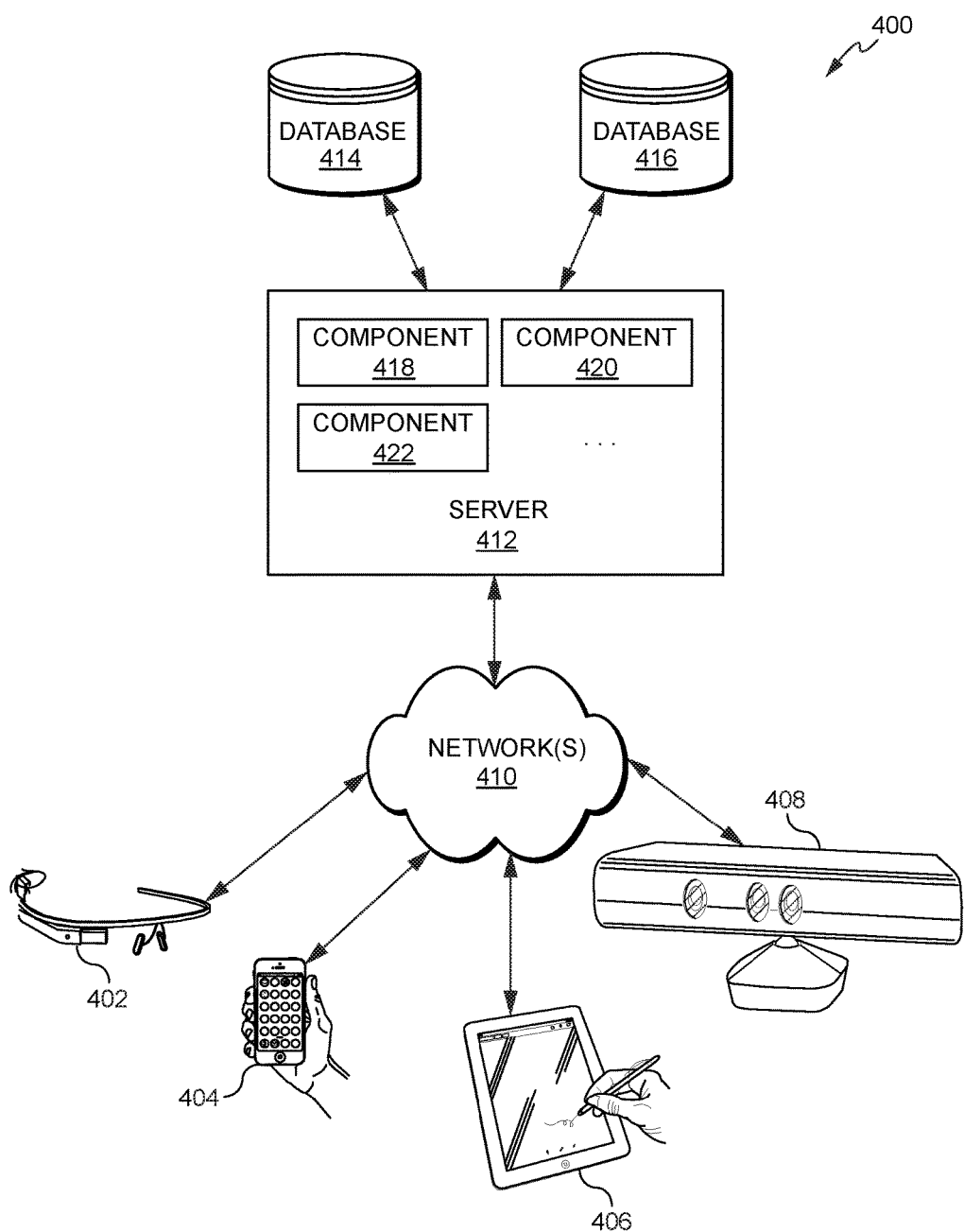
FIG. 4 depicts a simplified diagram of a distributed system for implementing various embodiments.

FIG. 4 depicts a simplified diagram of a distributed system 400 for implementing an embodiment. In the illustrated embodiment, distributed system 400 includes one or more client computing devices 402, 404, 406, and 408, which are configured to execute and operate a client application such as a web browser, proprietary client (e.g., Oracle Forms), or the like over one or more network(s) 410. Server 412 may be communicatively coupled with remote client computing devices 402, 404, 406, and 408 via network 410.

In various embodiments, server 412 may be adapted to run one or more services or software applications such as services and applications that provide the document (e.g., webpage) analysis and modification-related processing. In certain embodiments, server 412 may also provide other services or software applications that can include non-virtual and virtual environments. In some embodiments, these services may be offered as web-based or cloud services or under a Software as a Service (SaaS) model to the users of client computing devices 402, 404, 406, and/or 408. Users operating client computing devices 402, 404, 406, and/or 408 may in turn utilize one or more client applications to interact with server 412 to utilize the services provided by these components.

In the configuration depicted in FIG. 4, software components 418, 420 and 422 of system 400 are shown as being implemented on server 412. In other embodiments, one or more of the components of system 400 and/or the services provided by these components may also be implemented by one or more of the client computing devices 402, 404, 406, and/or 408. Users operating the client computing devices may then utilize one or more client applications to use the services provided by these components. These components may be implemented in hardware, firmware, software, or combinations thereof. It should be appreciated that various different system configurations are possible, which may be different from distributed system 400. The embodiment shown in FIG. 4 is thus one example of a distributed system for implementing an embodiment system and is not intended to be limiting.

Client computing devices 402, 404, 406, and/or 408 may include various types of computing systems. For example, client computing devices may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox® gaming console with or without a Kinect® gesture input device), and/or a personal messaging device, capable of communicating over network(s) 410.

Although distributed system 400 in FIG. 4 is shown with four client computing devices, any number of client computing devices may be supported. Other devices, such as devices with sensors, etc., may interact with server 412.

Network(s) 410 in distributed system 400 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 410 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 412 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 412 can include one or more virtual machines running virtual operating systems, or other computing architectures involving virtualization. One or more flexible pools of logical storage devices can be virtualized to maintain virtual storage devices for the server. Virtual networks can be controlled by server 412 using software defined networking. In various embodiments, server 412 may be adapted to run one or more services or software applications described in the foregoing disclosure. For example, server 412 may correspond to a server for performing processing as described above according to an embodiment of the present disclosure.

Server 412 may run an operating system including any of those discussed above, as well as any commercially available server operating system. Server 412 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 412 may include one or more applications to analyze and consolidate data feeds and/or event updates received from users of client computing devices 402, 404, 406, and 408. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 412 may also include one or more applications to display the data feeds and/or real-time events via one or more display devices of client computing devices 402, 404, 406, and 408.

Distributed system 400 may also include one or more databases 414 and 416. These databases may provide a mechanism for storing information such as user interactions information, usage patterns information, adaptation rules information, and other information used by embodiments of the present invention. Databases 414 and 416 may reside in a variety of locations. By way of example, one or more of databases 414 and 416 may reside on a non-transitory storage medium local to (and/or resident in) server 412. Alternatively, databases 414 and 416 may be remote from server 412 and in communication with server 412 via a network-based or dedicated connection. In one set of embodiments, databases 414 and 416 may reside in a storage-area network (SAN). Similarly, any necessary files for performing the functions attributed to server 412 may be stored locally on server 412 and/or remotely, as appropriate. In one set of embodiments, databases 414 and 416 may include relational databases, such as databases provided by Oracle, that are adapted to store, update, and retrieve data in response to SQL-formatted commands.

Figure 5:
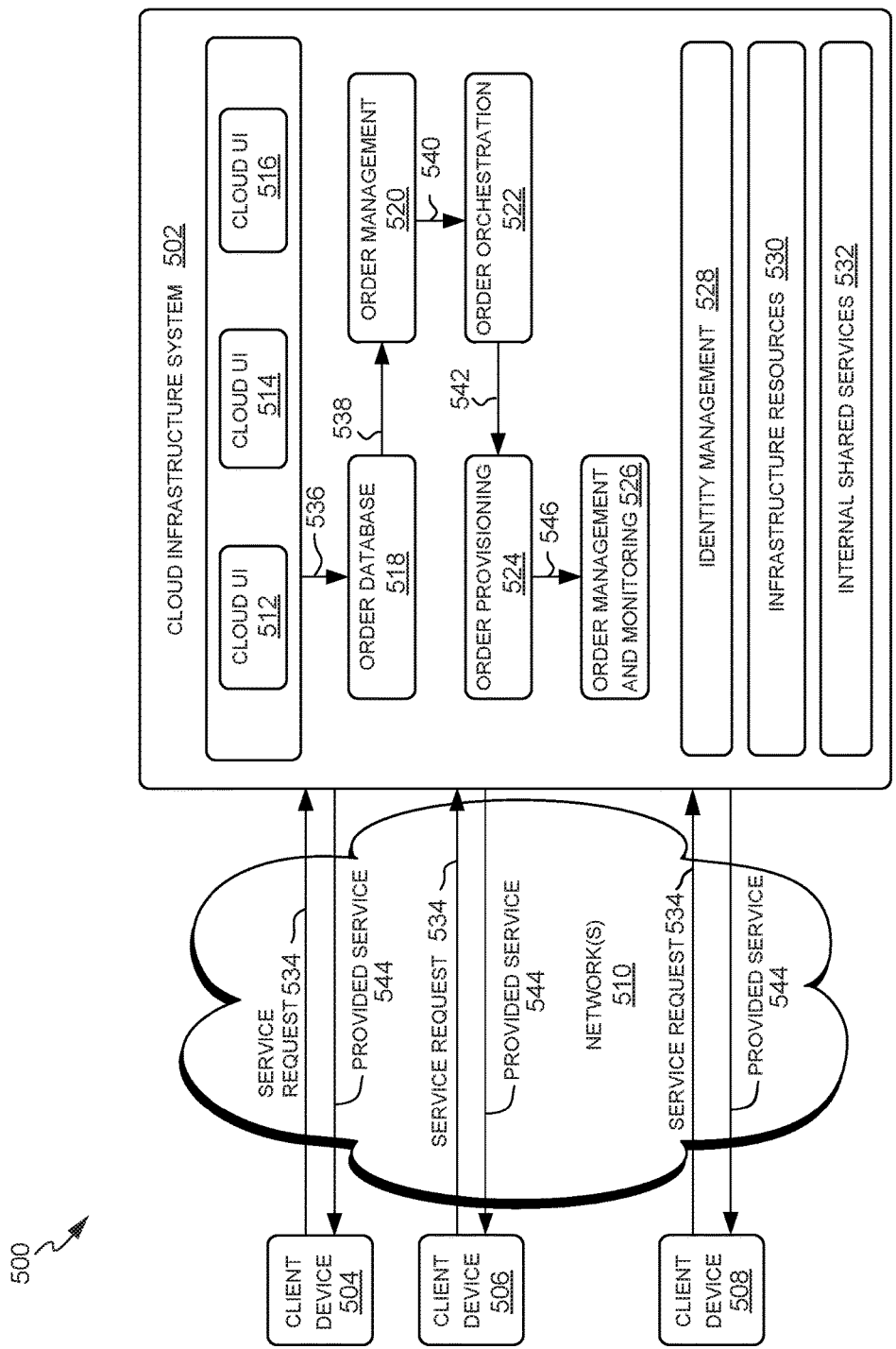
FIG. 5 is a simplified block diagram of one or more components of a system environment in which services may be offered as cloud services, in accordance with various embodiments.

In some embodiments, the document analysis and modification services described above may be offered as services via a cloud environment. FIG. 5 is a simplified block diagram of one or more components of a system environment 500 in which services may be offered as cloud services, in accordance with an embodiment of the present disclosure. In the illustrated embodiment in FIG. 5, system environment 500 includes one or more client computing devices 504, 506, and 508 that may be used by users to interact with a cloud infrastructure system 502 that provides cloud services, including services for dynamically modifying documents (e.g., webpages) responsive to usage patterns. Cloud infrastructure system 502 may comprise one or more computers and/or servers that may include those described above for server 412.

It should be appreciated that cloud infrastructure system 502 depicted in FIG. 5 may have other components than those depicted. Further, the embodiment shown in FIG. 5 is only one example of a cloud infrastructure system that may incorporate an embodiment of the invention. In some other embodiments, cloud infrastructure system 502 may have more or fewer components than shown in the figure, may combine two or more components, or may have a different configuration or arrangement of components.

Client computing devices 504, 506, and 508 may be devices similar to those described above for 402, 404, 406, and 408. Client computing devices 504, 506, and 508 may be configured to operate a client application such as a web browser, a proprietary client application (e.g., Oracle Forms), or some other application, which may be used by a user of the client computing device to interact with cloud infrastructure system 502 to use services provided by cloud infrastructure system 502. Although exemplary system environment 500 is shown with three client computing devices, any number of client computing devices may be supported. Other devices such as devices with sensors, etc. may interact with cloud infrastructure system 502.

Network(s) 510 may facilitate communications and exchange of data between clients 504, 506, and 508 and cloud infrastructure system 502. Each network may be any type of network familiar to those skilled in the art that can support data communications using any of a variety of commercially-available protocols, including those described above for network(s) 410.

In certain embodiments, services provided by cloud infrastructure system 502 may include a host of services that are made available to users of the cloud infrastructure system on demand. In addition to services related to dynamic document modification responsive usage patterns, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 502 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's website.

In certain embodiments, cloud infrastructure system 502 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 502 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 502 may be adapted to automatically provision, manage and track a customer's subscription to services offered by cloud infrastructure system 502. Cloud infrastructure system 502 may provide the cloud services via different deployment models. For example, services may be provided under a public cloud model in which cloud infrastructure system 502 is owned by an organization selling cloud services (e.g., owned by Oracle Corporation) and the services are made available to the general public or different industry enterprises. As another example, services may be provided under a private cloud model in which cloud infrastructure system 502 is operated solely for a single organization and may provide services for one or more entities within the organization. The cloud services may also be provided under a community cloud model in which cloud infrastructure system 502 and the services provided by cloud infrastructure system 502 are shared by several organizations in a related community. The cloud services may also be provided under a hybrid cloud model, which is a combination of two or more different models.

In some embodiments, the services provided by cloud infrastructure system 502 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 502. Cloud infrastructure system 502 then performs processing to provide the services in the customer's subscription order.

In some embodiments, the services provided by cloud infrastructure system 502 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 502 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 502 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 502 may also include infrastructure resources 530 for providing the resources used to provide various services to customers of the cloud infrastructure system. In one embodiment, infrastructure resources 530 may include pre-integrated and optimized combinations of hardware, such as servers, storage, and networking resources to execute the services provided by the PaaS platform and the SaaS platform, and other resources.

In some embodiments, resources in cloud infrastructure system 502 may be shared by multiple users and dynamically re-allocated per demand. Additionally, resources may be allocated to users in different time zones. For example, cloud infrastructure system 502 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 532 may be provided that are shared by different components or modules of cloud infrastructure system 502 to enable provision of services by cloud infrastructure system 502. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 502 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 502, and the like.

In one embodiment, as depicted in FIG. 5, cloud management functionality may be provided by one or more modules, such as an order management module 520, an order orchestration module 522, an order provisioning module 524, an order management and monitoring module 526, and an identity management module 528. These modules may include or be provided using one or more computers and/or servers, which may be general purpose computers, specialized server computers, server farms, server clusters, or any other appropriate arrangement and/or combination.

In an exemplary operation, at 534, a customer using a client device, such as client device 504, 506 or 508, may interact with cloud infrastructure system 502 by requesting one or more services provided by cloud infrastructure system 502 and placing an order for a subscription for one or more services offered by cloud infrastructure system 502. In certain embodiments, the customer may access a cloud User Interface (UI) such as cloud UI 512, cloud UI 514 and/or cloud UI 516 and place a subscription order via these UIs. The order information received by cloud infrastructure system 502 in response to the customer placing an order may include information identifying the customer and one or more services offered by the cloud infrastructure system 502 that the customer intends to subscribe to.

At 536, the order information received from the customer may be stored in an order database 518. If this is a new order, a new record may be created for the order. In one embodiment, order database 518 can be one of several databases operated by cloud infrastructure system 518 and operated in conjunction with other system elements.

At 538, the order information may be forwarded to an order management module 520 that may be configured to perform billing and accounting functions related to the order, such as verifying the order, and upon verification, booking the order.

At 540, information regarding the order may be communicated to an order orchestration module 522 that is configured to orchestrate the provisioning of services and resources for the order placed by the customer. In some instances, order orchestration module 522 may use the services of order provisioning module 524 for the provisioning. In certain embodiments, order orchestration module 522 enables the management of business processes associated with each order and applies business logic to determine whether an order should proceed to provisioning.

As shown in the embodiment depicted in FIG. 5, at 542, upon receiving an order for a new subscription, order orchestration module 522 sends a request to order provisioning module 524 to allocate resources and configure resources needed to fulfill the subscription order. Order provisioning module 524 enables the allocation of resources for the services ordered by the customer. Order provisioning module 524 provides a level of abstraction between the cloud services provided by cloud infrastructure system 500 and the physical implementation layer that is used to provision the resources for providing the requested services. This enables order orchestration module 522 to be isolated from implementation details, such as whether or not services and resources are actually provisioned on the fly or pre-provisioned and only allocated/assigned upon request.

At 544, once the services and resources are provisioned, a notification may be sent to the subscribing customers indicating that the requested service is now ready for use. In some instance, information (e.g. a link) may be sent to the customer that enables the customer to start using the requested services.

At 546, a customer's subscription order may be managed and tracked by an order management and monitoring module 526. In some instances, order management and monitoring module 526 may be configured to collect usage statistics regarding a customer use of subscribed services. For example, statistics may be collected for the amount of storage used, the amount of data transferred, the number of users, and the amount of system up time and system down time, and the like.

In certain embodiments, cloud infrastructure system 500 may include an identity management module 528 that is configured to provide identity services, such as access management and authorization services in cloud infrastructure system 500. In some embodiments, identity management module 528 may control information about customers who wish to utilize the services provided by cloud infrastructure system 502. Such information can include information that authenticates the identities of such customers and information that describes which actions those customers are authorized to perform relative to various system resources (e.g., files, directories, applications, communication ports, memory segments, etc.) Identity management module 528 may also include the management of descriptive information about each customer and about how and by whom that descriptive information can be accessed and modified.

Figure 6:
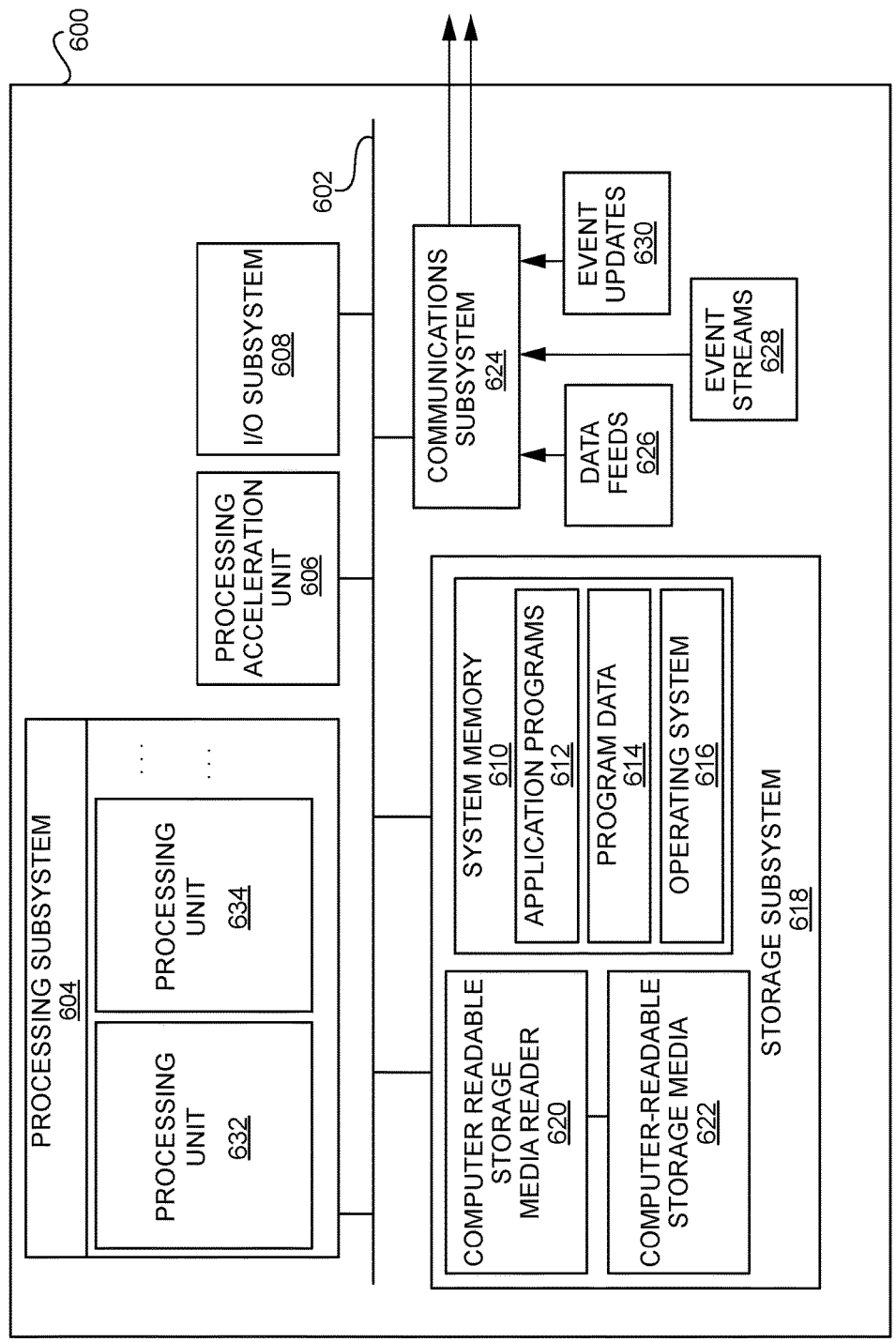
FIG. 6 illustrates an exemplary computer system that may be used to implement various embodiments.

FIG. 6 illustrates an exemplary computer system 600 that may be used to implement an embodiment of the present invention. In some embodiments, computer system 600 may be used to implement any of the various servers and computer systems described above. As shown in FIG. 6, computer system 600 includes various subsystems including a processing unit 604 that communicates with a number of peripheral subsystems via a bus subsystem 602. These peripheral subsystems may include a processing acceleration unit 606, an I/O subsystem 608, a storage subsystem 618 and a communications subsystem 624. Storage subsystem 618 may include tangible computer-readable storage media 622 and a system memory 610.

Bus subsystem 602 provides a mechanism for letting the various components and subsystems of computer system 600 communicate with each other as intended. Although bus subsystem 602 is shown schematically as a single bus, alternative embodiments of the bus subsystem may utilize multiple buses. Bus subsystem 602 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 604 controls the operation of computer system 600 and may comprise one or more processing units 632, 634, etc. A processing unit may include be one or more processors, including single core or multicore processors, one or more cores of processors, or combinations thereof. In some embodiments, processing subsystem 604 can include one or more special purpose co-processors such as graphics processors, digital signal processors (DSPs), or the like. In some embodiments, some or all of the processing units of processing subsystem 604 can be implemented using customized circuits, such as application specific integrated circuits (ASICs), or field programmable gate arrays (FPGAs).

In some embodiments, the processing units in processing subsystem 604 can execute instructions stored in system memory 610 or on computer readable storage media 622. In various embodiments, the processing units can execute a variety of programs or code instructions and can maintain multiple concurrently executing programs or processes. At any given time, some or all of the program code to be executed can be resident in system memory 610 and/or on computer-readable storage media 622 including potentially on one or more storage devices. Through suitable programming, processing subsystem 604 can provide various functionalities described above for dynamically modifying documents (e.g., webpages) responsive to usage patterns.

In certain embodiments, a processing acceleration unit 606 may be provided for performing customized processing or for off-loading some of the processing performed by processing subsystem 604 so as to accelerate the overall processing performed by computer system 600.

I/O subsystem 608 may include devices and mechanisms for inputting information to computer system 600 and/or for outputting information from or via computer system 600. In general, use of the term "input device" is intended to include all possible types of devices and mechanisms for inputting information to computer system 600. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google) Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 600 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 618 provides a repository or data store for storing information that is used by computer system 600. Storage subsystem 618 provides a tangible non-transitory computer-readable storage medium for storing the basic programming and data constructs that provide the functionality of some embodiments. Software (programs, code modules, instructions) that when executed by processing subsystem 604 provide the functionality described above may be stored in storage subsystem 618. The software may be executed by one or more processing units of processing subsystem 604. Storage subsystem 618 may also provide a repository for storing data used in accordance with the present invention.

Storage subsystem 618 may include one or more non-transitory memory devices, including volatile and non-volatile memory devices. As shown in FIG. 6, storage subsystem 618 includes a system memory 610 and a computer-readable storage media 622. System memory 610 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 600, such as during start-up, may typically be stored in the ROM. The RAM typically contains data and/or program modules that are presently being operated and executed by processing subsystem 604. In some implementations, system memory 610 may include multiple different types of memory, such as static random access memory (SRAM) or dynamic random access memory (DRAM).

By way of example, and not limitation, as depicted in FIG. 6, system memory 610 may store application programs 612, which may include client applications, Web browsers, mid-tier applications, relational database management systems (RDBMS), etc., program data 614, and an operating system 616. By way of example, operating system 616 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 622 may store programming and data constructs that provide the functionality of some embodiments. Software (programs, code modules, instructions) that, when executed by processing subsystem 604 provides the functionality described above, may be stored in storage subsystem 618. By way of example, computer-readable storage media 622 may include non-volatile memory such as a hard disk drive, a magnetic disk drive, an optical disk drive such as a CD ROM, DVD, a Blu-Ray® disk, or other optical media. Computer-readable storage media 622 may include, but is not limited to, Zip® drives, flash memory cards, universal serial bus (USB) flash drives, secure digital (SD) cards, DVD disks, digital video tape, and the like. Computer-readable storage media 622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 622 may provide storage of computer-readable instructions, data structures, program modules, and other data for computer system 600.

In certain embodiments, storage subsystem 600 may also include a computer-readable storage media reader 620 that can further be connected to computer-readable storage media 622. Together and, optionally, in combination with system memory 610, computer-readable storage media 622 may comprehensively represent remote, local, fixed, and/or removable storage devices plus storage media for storing computer-readable information.

In certain embodiments, computer system 600 may provide support for executing one or more virtual machines. Computer system 600 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 600. Accordingly, multiple operating systems may potentially be run concurrently by computer system 600. Each virtual machine generally runs independently of the other virtual machines.

Communications subsystem 624 provides an interface to other computer systems and networks. Communications subsystem 624 serves as an interface for receiving data from and transmitting data to other systems from computer system 600. For example, communications subsystem 624 may enable computer system 600 to establish a communication channel to one or more client devices via an Internet network for receiving and sending information from and to the client devices.

Communication subsystem 624 may support both wired and/or wireless communication protocols. For example, in certain embodiments, communications subsystem 624 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 624 can provide wired network connectivity (e.g., Ethernet) in addition to or instead of a wireless interface.

Communication subsystem 624 can receive and transmit data in various forms. For example, in some embodiments, communications subsystem 624 may receive input communication in the form of structured and/or unstructured data feeds 626, event streams 628, event updates 630, and the like. For example, communications subsystem 624 may be configured to receive (or send) data feeds 626 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 624 may be configured to receive data in the form of continuous data streams, which may include event streams 628 of real-time events and/or event updates 630, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 624 may also be configured to output the structured and/or unstructured data feeds 626, event streams 628, event updates 630, and the like to one or more databases that may be in communication with one or more streaming data source computers coupled to computer system 600.

Computer system 600 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 600 depicted in FIG. 6 is intended only as a specific example. Many other configurations having more or fewer components than the system depicted in FIG. 6 are possible. Based on the disclosure and teachings provided herein, a person of ordinary skill in the art will appreciate other ways and/or methods to implement the various embodiments.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although various embodiments have been described, these are not intended to be limiting. Various modifications and equivalents are within the scope of the following claims.

What is claimed is:

1. A method for dynamically determining a size of a partition, comprising:
   executing, by a computing device using a reader, a journal read process to read one or more journals;
   determining, by the computing device, whether the reader is at an end of a journal;
   determining, by the computing device, whether a last entry of the journal is user defined with a marker journal entry, when the reader is at the end of the journal;
   marking, by the computing device, the journal as synced, when the last entry of the journal is user defined with the marker journal entry;
   determining, by the computing device, whether the reader is expecting a specific marker entry sync identifier, when the last entry of the journal is not user defined with the marker journal entry; and
   writing, by the computing device, a new marker journal entry in the journal and marking all journals as needing a sync, when the reader is expecting the specific marker entry sync identifier.

2. The method of claim 1, wherein the marker journal entry is written to the journal using an application one or more application program interfaces (API) of the operating system.

3. The method of claim 2, wherein operating system is the IBM i operating system.

4. The method of claim 3, further comprising writing, by the computing device, a new marker entry in the journal, and marking all journals as needing a sync, when the reader is not at the end of the journal.

5. The method of claim 4, further comprising executing, by the computing device using the reader, the journal read process to re-read the journal, when the reader is not expecting the specific marker entry sync identifier.

6. The method of claim 5, wherein determining whether the reader is at the end of the journal includes determining when a read of the journal is complete, and the API will indicate whether there are more entries left to read or not through a flag in a returned buffer header provided by the API.

7. The method of claim 6, wherein marking the journal as synced includes using a flag that indicates whether or not the journal is considered as read synced or not at any given time for purposes of being able to merge entries from the one or more journals in an order in which the entries have occurred.

8. A system, comprising:
   a memory configured to store computer-executable instructions; and
   a processor configured to access the memory and execute the computer-executable instructions to:
   execute, using a reader, a journal read process to read one or more journals;
   determine whether the reader is at an end of a journal;
   determine whether a last entry of the journal is user defined with a marker journal entry, when the reader is at the end of the journal;
   mark the journal as synced, when the last entry of the journal is user defined with the marker journal entry;
   determine whether the reader is expecting a specific marker entry sync identifier, when the last entry of the journal is not user defined with the marker journal entry; and
   write a new marker journal entry in the journal and marking all journals as needing a sync, when the reader is expecting the specific marker entry sync identifier.

9. The system of claim 8, wherein the marker journal entry is written to the journal using an application one or more application program interfaces (API) of the operating system.

10. The system of claim 9, wherein operating system is the IBM i operating system.

11. The system of claim 10, wherein the computer-executable instructions are further executable to write a new marker entry in the journal, and marking all journals as needing a sync, when the reader is not at the end of the journal.

12. The system of claim 11, wherein the computer-executable instructions are further executable to execute, using the reader, the journal read process to re-read the journal, when the reader is not expecting the specific marker entry sync identifier.

13. The system of claim 12, wherein determining whether the reader is at the end of the journal includes determining when a read of the journal is complete, and the API will indicate whether there are more entries left to read or not through a flag in a returned buffer header provided by the API.

14. The system of claim 13, wherein marking the journal as synced includes using a flag that indicates whether or not the journal is considered as read synced or not at any given time for purposes of being able to merge entries from the one or more journals in an order in which the entries have occurred.

15. A non-transitory computer-readable storage medium storing computer-executable code that, when executed by a processor, cause the processor to perform operations comprising:

executing, using a reader, a journal read process to read one or more journals;

determining whether the reader is at an end of a journal;

determining whether a last entry of the journal is user defined with a marker journal entry, when the reader is at the end of the journal;

marking the journal as synced, when the last entry of the journal is user defined with the marker journal entry;

determining whether the reader is expecting a specific marker entry sync identifier, when the last entry of the journal is not user defined with the marker journal entry; and writing a new marker journal entry in the journal and marking all journals as needing a sync, when the reader is expecting the specific marker entry sync identifier.

16. The non-transitory computer-readable storage medium of claim 15, wherein the marker journal entry is written to the journal using an application one or more application program interfaces (API) of the operating system.

17. The non-transitory computer-readable storage medium of claim 16, wherein operating system is the IBM i operating system.

* * * * *

UNITED STATES PATENT AND TRADEMARK OFFICE
CERTIFICATE OF CORRECTION

PATENT NO. : 10,394,795 B2  
APPLICATION NO. : 15/707586  
DATED : August 27, 2019  
INVENTOR(S) : Johnston Page 1 of 1

It is certified that error appears in the above-identified patent and that said Letters Patent is hereby corrected as shown below:

In the Drawings

On sheet 1 of 6, in FIG. 1, under Reference Numeral 145, Line 2, delete "Reacter" and insert -- Reader --, therefor.

In the Specification

In Column 2, Line 47, delete "instructions to." and insert -- instructions. --, therefor.

In Column 3, Line 57, after "medium" insert -- . --.

In Column 18, Line 18, delete "Google)" and insert -- Google --, therefor.

Signed and Sealed this  
Twenty-fifth Day of August, 2020

Andrei Iancu  
*Director of the United States Patent and Trademark Office*